US012704323B2

United States Patent

(12) United States Patent
Borisevich et al.

(10) Patent No.: US 12,704,323 B2
(45) Date of Patent: Aug. 11, 2026

(54) METHOD AND SYSTEM FOR PROCESSING GAS IN A GAS STORAGE FACILITY FOR A GAS TANKER

(71) Applicant: GAZTRANSPORT ET TECHNIGAZ, Saint Remy les Chevreuse (FR)

(72) Inventors: Pavel Borisevich, Saint Remy les Chevreuse (FR); Bernard Aoun, Saint Remy les Chevreuse (FR); Martin Buissart, Saint Remy les Chevreuse (FR); Bruno Deletré, Saint Remy les Chevreuse (FR)

(73) Assignee: GAZTRANSPORT ET TECHNIGAZ, Saint Remy les Chevreuse (FR)

(*) Notice: Subject to any disclaimer, the term of this patent is extended or adjusted under 35 U.S.C. 154(b) by 1498 days.

(21) Appl. No.: 17/048,529

(22) PCT Filed: Jan. 23, 2019

(86) PCT No.: PCT/EP2019/051590
§ 371 (c)(1),
(2) Date: Oct. 16, 2020

(87) PCT Pub. No.: WO2019/145342
PCT Pub. Date: Aug. 1, 2019

(65) Prior Publication Data

US 2021/0164728 A1 Jun. 3, 2021

(30) Foreign Application Priority Data

Jan. 23, 2018 (FR) ..................................... 18 50519
Feb. 9, 2018 (FR) ..................................... 18 51136

(51) Int. Cl.
*F25J 1/02* (2006.01)
*F17C 7/04* (2006.01)
*F25J 1/00* (2006.01)

(52) U.S. Cl.
CPC ............... *F25J 1/0201* (2013.01); *F17C 7/04* (2013.01); *F25J 1/0025* (2013.01);
(Continued)

(58) Field of Classification Search
CPC ...... F25J 1/0201; F25J 1/0025; F25J 2290/34; F25J 2290/62; F25J 2210/62;
(Continued)

(56) References Cited

U.S. PATENT DOCUMENTS 3,302,416 A * 2/1967 Proctor .................. F25J 1/0022 62/48.2
3,733,838 A * 5/1973 Delahunty ............. F25J 1/0045 62/48.2

(Continued)

FOREIGN PATENT DOCUMENTS

FR 2 880 942 A1 7/2006

OTHER PUBLICATIONS

International Search Report issued Jun. 6, 2019 in PCT/EP2019/051590 filed Jan. 23, 2019, 3 pages.

*Primary Examiner* — Joel M Attey
*Assistant Examiner* — Ibrahim A. Michael Adeniji
(74) *Attorney, Agent, or Firm* — Oblon, McClelland, Maier & Neustadt, L.L.P.

(57) ABSTRACT

The invention relates to a gas treatment method and system of a gas storage facility (2), in particular on board a ship, the method comprising the following stages:

Figure 1:
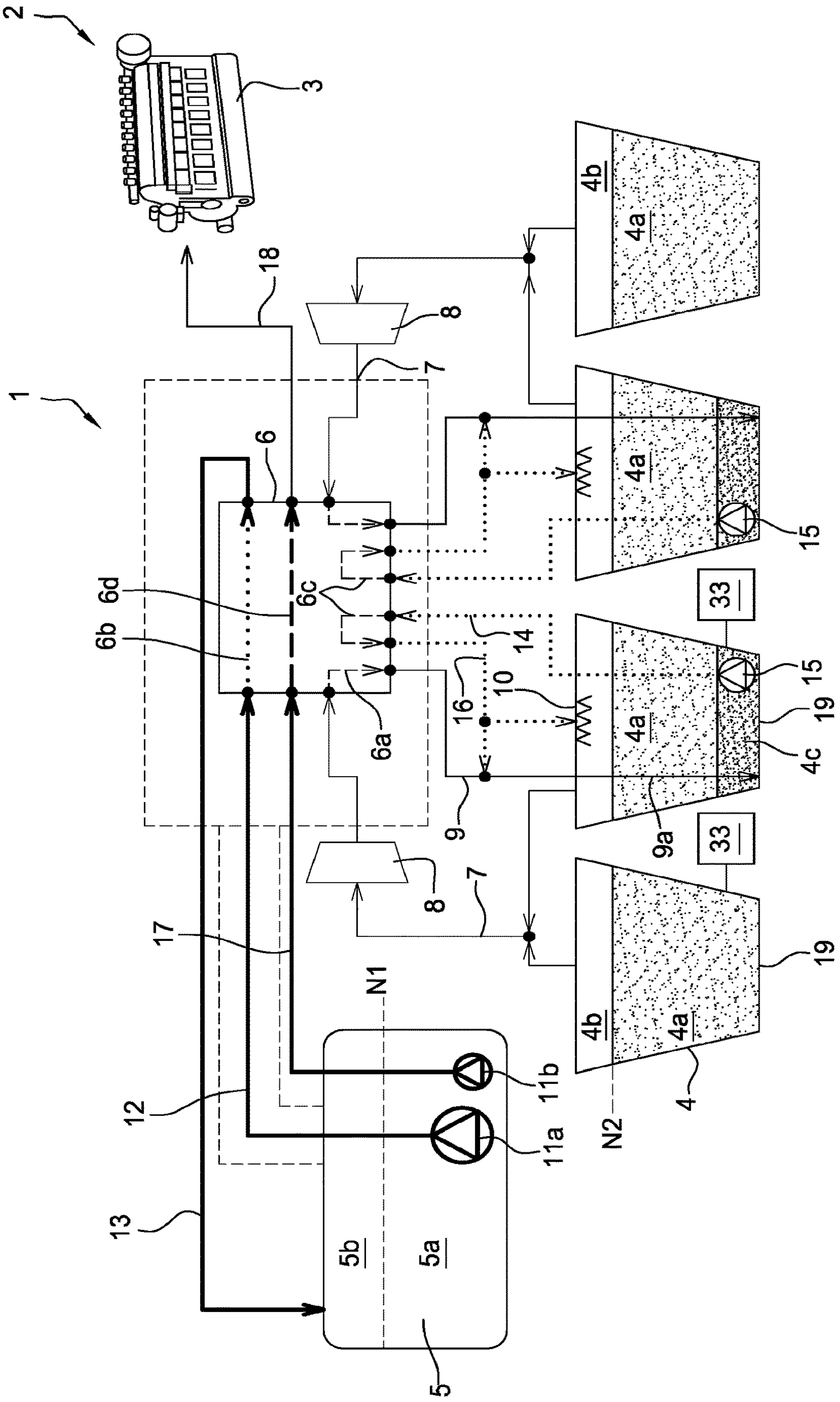

an extraction of a first gas (4*a*, 4*b*, 5*a*, 5*b*,) in the liquid state from a first tank (4) or first vessel (5; 500), a first subcooling of the first gas in the liquid state, and storage of the subcooled first gas in the liquid state in the lower part of the first tank (4) or of the first vessel (5; 500) or of a second tank or of a second vessel, so as to constitute a reserve layer of cold (4*c*, 5*c*, 500*c*) of the (Continued)

subcooled first gas in the liquid state at the bottom of the first or second tank (4) or of the first or second vessel (5; 500).

35 Claims, 6 Drawing Sheets

(52) U.S. Cl.
CPC *F17C 2205/0352* (2013.01); *F17C 2221/033* (2013.01); *F17C 2223/0169* (2013.01); *F17C 2227/0337* (2013.01); *F17C 2227/0393* (2013.01); *F17C 2250/0636* (2013.01); *F17C 2270/0105* (2013.01); *F25J 2290/34* (2013.01); *F25J 2290/62* (2013.01)

(58) Field of Classification Search
CPC .. F25J 2215/64; F25J 2215/66; F25J 2230/30; F25J 1/0045; F25J 1/0221; F25J 1/023; F25J 1/0236; F25J 1/0264; F25J 1/0277; F25J 1/0052; F25J 1/0072; F25J 1/0075; F25J 1/0082; F25J 1/0204; F17C 7/04; F17C 2205/0352; F17C 2221/033; F17C 2223/0169; F17C 2227/0337; F17C 2227/0393; F17C 2250/0636; F17C 2270/0105; F17C 2205/013; F17C 2221/035; F17C 2223/0153; F17C 2223/0161; F17C 2223/033; F17C 2223/035; F17C 2223/041; F17C 2223/043; F17C 2223/047; F17C 2225/0123; F17C 2225/0153; F17C 2225/0161; F17C 2225/0169; F17C 2225/033; F17C 2225/035; F17C 2225/041; F17C 2225/044; F17C 2225/047; F17C 2227/0107; F17C 2227/0135; F17C 2227/0178; F17C 2227/0306; F17C 2227/0309; F17C 2227/0323; F17C 2227/0327; F17C 2227/0339; F17C 2227/0341; F17C 2227/0355; F17C 2227/036; F17C 2227/0365; F17C 2227/0388; F17C 2250/0626; F17C 2260/031; F17C 2260/035; F17C 2260/04; F17C 2265/017; F17C 2265/032; F17C 2265/034; F17C 2265/035; F17C 2265/036; F17C 2265/037; F17C 2265/066; F17C 2265/07; F17C 13/004; F17C 9/04; B63J 2099/003; B63J 2/14; Y02T 70/50; F02M 21/0212; F02M 21/0215; F02M 21/0287; F25B 9/002; F25B 25/005; F25B 40/00; F25B 30/02; B63B 25/16
See application file for complete search history.

(56) References Cited

U.S. PATENT DOCUMENTS

| | | | | | |
|---|---|---|---|---|---|
| 4,187,689 | A * | 2/1980 | Selcukoglu | F25J 1/0022 | 62/48.2 |
| 4,249,387 | A * | 2/1981 | Crowley | F25J 1/0045 | 62/48.2 |
| 4,888,955 | A * | 12/1989 | Tyree, Jr. | F17C 7/02 | 62/47.1 |
| 5,243,821 | A * | 9/1993 | Schuck | F17C 7/04 | 62/50.1 |
| 5,549,142 | A * | 8/1996 | Beale | F17C 6/00 | 141/49 |
| 8,959,930 | B2 * | 2/2015 | Lee | F17C 13/028 | 62/48.1 |
| 2006/0086100 | A1 * | 4/2006 | Taube | F17C 7/04 | 62/48.1 |
| 2006/0156758 | A1 * | 7/2006 | An | F25J 1/0045 | 62/613 |
| 2007/0068177 | A1 * | 3/2007 | Higginbotham | F25J 1/0017 | 62/47.1 |
| 2008/0120993 | A1 | 5/2008 | An et al. | | |
| 2010/0139316 | A1 * | 6/2010 | An | F25J 1/0025 | 62/53.2 |
| 2013/0008194 | A1 * | 1/2013 | Hattori | F25B 49/02 | 62/84 |
| 2015/0000334 | A1 * | 1/2015 | Edwards | F25J 1/0278 | 62/611 |
| 2015/0219280 | A1 | 8/2015 | Braithwaite et al. | | |
| 2015/0219391 | A1 * | 8/2015 | Sauer | F25J 1/0072 | 62/48.2 |
| 2015/0219393 | A1 | 8/2015 | Sauer et al. | | |
| 2015/0330574 | A1 * | 11/2015 | Fuchs | F25J 1/0265 | 62/48.2 |
| 2015/0377550 | A1 * | 12/2015 | Sakai | F25J 1/0025 | 62/48.2 |
| 2019/0257475 | A1 * | 8/2019 | Bernhardt | F25J 1/0077 | |
| 2019/0323659 | A1 * | 10/2019 | Hodgson | F17C 13/002 | |

* cited by examiner

METHOD AND SYSTEM FOR PROCESSING GAS IN A GAS STORAGE FACILITY FOR A GAS TANKER

1. TECHNICAL FIELD

The invention relates to a gas treatment method and system of a gas storage facility, in particular on board a ship, such as a liquefied gas transport ship, the facility of which is powered by the gas originating from the cargo stored on the ship.

2. STATE OF THE ART

It is known to transport on a ship several types of gas in liquefied form in order to facilitate their transportation over long distances. Examples of liquefied gas are liquefied natural gas (LNG) or liquefied petroleum gas (LPG). The gases are cooled to very low temperatures, indeed even to cryogenic temperatures, in order for them to be liquid at a pressure close to atmospheric pressure and to load them onto specialized vessels. Liquefied natural gas and liquefied petroleum gas are used as fuels for various items of equipment in any type of industry. Recently, liquefied natural gas has been used for the energy needs of the powering of ships, and in particular those transporting liquefied petroleum gases and liquefied natural gas, so as to meet new environmental regulations restricting emissions of sulfur oxide (SOx) and of nitrogen oxide (NOx) in "ECA" (Emission Control Area) and "SECA" (SOx Emission Control Area) areas, for example.

These liquefied natural gases and liquefied petroleum gases are stored in thermally insulated vessels at very low temperatures on ships in order to keep the gases in the liquid state. The vessels absorb heat inside them, which contributes to an evaporation of a part of the gases in the vessels, which is known by the acronym NBOG for Natural Boil-Off Gas (as opposed to forced evaporation of gas or FBOG, an acronym for Forced Boil-Off Gas). Other parameters, such as the movements of the gases inside the vessels due to the state of the sea during sailing and the ambient conditions, also influence the evaporation of the gases. These gas vapors, which are stored in the upper part of the vessels in a gaseous headspace above the liquefied gases, increase the pressure in the vessel. This increase in pressure can cause the vessels to rupture.

The vapors of liquefied natural gas are used to supply the abovementioned energy production facility. In the case of natural evaporation, where the amount of naturally evaporated gas is insufficient for the fuel gas demand of the facility, means such as a pump immersed in the vessel are actuated in order to supply more fuel gas after a forced evaporation. Forced evaporation is carried out in particular from hot water which is heated by oil or a gas burner. All the cold of the liquefied natural gas is lost during this operation. When the amount of gas evaporated is too large with respect to the demand of the facility, the excess gas is generally incinerated in a gas combustion unit, which represents a loss of the cargo.

In the current technology, the improvements to liquefied natural gas vessels are such that the natural evaporation rates (BOR—acronym for Boil-Off Rate) of liquefied gases are increasingly low. Consequently, the devices of a ship are increasingly efficient. This has the consequence, in each of the first and second cases mentioned above, that the difference is very large between the quantity of gas naturally produced by evaporation and that required by the facility of a ship.

As regards liquefied petroleum gases, natural evaporation of the gases is unavoidable and occurs, for example, during operations of charging to their storage tanks, of voyage of the ship or of cooling the tanks following heat exchanges between the tanks and the external environment. The evaporation of the gases is managed by one or more reliquefaction system(s) making it possible to limit the natural evaporation of the liquefied gas while keeping it in a thermodynamic state allowing it to be stored in a durable manner and while controlling the pressure in the storage vessel. This is because today the ships transporting liquefied petroleum gas are not capable of incinerating the vapors of liquefied petroleum gas. The reliquefaction systems extract the gas vapors from the tanks, reliquefy them and return them to the storage tank. This or these reliquefaction systems can represent a capital cost of the order of 5% to 10% of the price of the ship.

The present invention proposes to provide a simple, efficient and economical solution making it possible to manage the natural or forced evaporation of gases in vessels or tanks and the energy needs of a storage facility, in particular on a ship, whatever the operating conditions of voyage, of cooling of the vessels or tanks and of charging of liquefied gases to the vessels.

3. DISCLOSURE OF THE INVENTION

According to a first aspect, the invention provides a gas treatment method of a gas storage facility, the facility comprising a tank in which a first gas is stored and a vessel in which a second gas is stored, the second gas having a lower boiling point than that of the first gas, the method comprising a reliquefaction stage in which vapors of the first gas moving in a first circuit from the tank are reliquefied by heat exchange with the second gas in the liquid state having an inlet temperature and moving in a second circuit, the reliquefied vapors of the first gas being transferred into the tank and the second gas being maintained in the liquid state at an outlet temperature after the reliquefaction and taken back to the vessel, the heat exchange between the first gas and the second gas being carried out so that an outlet temperature of the reliquefied vapors of the first gas is between a first threshold value and a second threshold value.

Thus, the invention makes it possible to manage the vapors of the first gas by using the cold of the second gas which is intended to supply the gas storage facility, which makes it possible to have an efficient, economical system while reducing the NOx and SOx emissions. In particular, reliquefying the vapors of the first gas with the second gas in the liquid state intended to return to the vessel makes it possible to reliquefy all the gas vapors generated in the tank of the first gas and at the right temperature. The reliquefaction of the first gas vapors is independent of the consumption of the facility. The second gas is heated following this heat exchange but is kept liquid so that it can be returned to the vessel.

The method can comprise one or more of the following characteristics or stages, taken in isolation from one another or in combination with one another:

- the temperature difference between the inlet temperature of the second gas before the reliquefaction stage and the outlet temperature of the second gas after the reliquefaction stage is between 20° C. and 30° C.,
- the outlet temperature of the second gas is less than the vaporization temperature of the second gas at a pressure less than or equal to a maximum authorized storage pressure value of the vessel, the reliquefied vapors of the first gas are transferred into the tank at a temperature greater than or equal to a minimum temperature value which has to be withstood by the tank, the outlet pressure of the second gas after the reliquefaction of the first gas is 8 bars, the outlet temperature of the second gas is between −155° C. and −105° C. at a pressure of between 2 and 20 bars, the first threshold value for outlet temperature of the first gas is substantially close to the liquefaction temperature of the first gas at atmospheric pressure and the second threshold temperature is less than the first threshold value by 10° C. to 40° C. at atmospheric pressure, the first threshold value is of the order of −40° C. and the second threshold value is of the order of −50° C., the vapors of the first gas are compressed before the heat exchange, the second gas is extracted from the bottom of the vessel, the heat exchange during the reliquefaction stage is carried out during an operation of charging the first gas or during an operation of cooling the tank, the first gas is a liquefied petroleum gas, the second gas is a liquefied natural gas.

The invention also relates to a gas treatment system of a gas storage facility, the system comprising:

a tank in which a first gas is stored, a vessel in which a second gas is stored, the second gas having a lower boiling point than that of the first gas, a first circuit in which at least a part of the vapors of the first gas from the tank move, a second circuit in which at least a part of the second gas in the liquid state at an inlet temperature from the vessel moves, and a heat exchanger configured in order to reliquefy at least a part of the vapors of the first gas by heat exchange with the second gas in the liquid state, the reliquefied vapors of the first gas being transferred into the tank and the second gas being maintained at the liquid state at an outlet temperature after the reliquefaction and taken back to the vessel, and in order for an outlet temperature of the vapors of the first gas to be between a first threshold value and a second threshold value.

The device according to the invention can comprise one or more of the following characteristics, taken in isolation from one another or in combination with one another:

the heat exchanger is configured in order for the temperature difference between the inlet temperature of the second gas before the reliquefaction stage and the outlet temperature after the reliquefaction stage to be between 5° C. and 55° C., the system comprises a compressor installed upstream of the first circuit so as to compress the vapor of the first gas to be extracted from the tank before the heat exchange, the second circuit forms, with pipes each connected to the vessel and to the second circuit, a closed circuit, the first gas is a liquefied petroleum gas, the second gas is a liquefied natural gas.

The invention also relates to a liquefied gas transport ship, comprising at least one system exhibiting any one of the abovementioned characteristics.

According to a second aspect, the invention provides a gas treatment method of a gas storage facility, in particular on board a ship, the method comprising the following stages:

an extraction of a first gas in the liquid state from a first tank or from a first vessel, a first subcooling of the first gas in the liquid state extracted, and storage of the subcooled first gas in the liquid state in the lower part of the first tank or of the first vessel or of a second tank or of a second vessel, so as to constitute a reserve layer of cold of the first gas in the liquid state, in the subcooled liquid state, at the bottom of the first or second tank or of the first or second vessel.

Thus, the subcooled first gas which is stored at the bottom of the tank or of the vessel makes it possible to create a refrigerating power which can be used subsequently, the reserve of cold being stored at the bottom of the tank or of the vessel in a durable manner. This reserve of cold can be used, for example, to reliquefy vapors of the first gas in the tank and/or to reduce the pressure in the tank and as soon as necessary. This reserve of cold can also be used without the need to supply the facility or to operate heat exchangers.

The method can comprise one or more of the following characteristics or stages, taken in isolation from one another or in combination with one another:

the first gas is subcooled to a temperature greater than or equal to a minimum temperature value which has to be withstood by the tank or the vessel, the reserve layer of cold is located in the first or second tank or first or second vessel below an amount of the first gas, forming a liquid-liquid interface, the subcooled first gas, in the liquid state, is transferred into the first or second tank or first or second vessel via a pipeline which emerges in the bottom of the first or second tank or first or second vessel, the first gas stored in the reserve layer of cold of the first or second tank or first or second vessel is used to cool a gas in the vapor state, the gas in the vapor state is the first gas in the vapor state located in the upper part of the tank or vessel and of the first gas in the liquid state, the first gas stored in the reserve layer of cold is sprayed into the first or second tanks or first or second vessels and into the layer of the first gas in the vapor state, the first gas stored in the reserve layer of cold is extracted from the bottom of one of the tanks or vessels and reliquefies the first gas in the vapor state through a heat exchanger, the subcooled first gas, in the liquid state, is stored in the reserve layer of cold when a measured pressure in the tank or vessel is less than a first predetermined pressure threshold value of the tank or of the vessel, the first predetermined threshold value is, for example, between 1 and 1.05 bar absolute, said lower part extends over approximately less than 30% of the height of the tank or vessel, measured from its bottom, said bottom being the lowermost end of the tank or vessel, the subcooled first gas, in the liquid state, is stored in the reserve layer of cold at a temperature between a liquefaction temperature of the first gas less approximately 5° C. at atmospheric pressure and a liquefaction temperature less approximately 10° C., the first gas in the liquid state remaining in the first or second tank or first or second vessel being at a temperature greater than the liquefaction temperature of the first gas, the subcooled first gas, in the liquid state, is stored in the reserve layer of cold at a temperature of between −45° C. and −55° C., the first gas in the liquid state remaining in the first or second tank or first or second vessel being at a temperature of greater than or equal to −42° C., the subcooled first gas is stored in the reserve layer of cold at a temperature between −160° C. and −170° C., the first gas in the liquid state remaining in the tank or vessel being at a temperature of greater than or equal to −160° C., the first subcooling of the first gas is carried out with a second gas at least in the liquid state extracted from a vessel, the second gas having a boiling point less than or equal to that of the first gas, the method comprises a vaporization or heating of the second gas which is heated or vaporized by heat exchange during the first subcooling of the first gas, so as to supply the facility, the facility controls a flow rate of the second gas which has to be vaporized or heated during the vaporization, the first subcooling of the first gas is carried out with the first gas extracted from the vessel which is expanded and partially vaporized, the second gas extracted from the vessel is expanded and partially vaporized before the heat exchange during the first subcooling, the second gas extracted from the vessel is subcooled by heat exchange with the expanded and partially vaporized second gas, a second subcooling of the first gas is carried out after the first subcooling, the second gas used for the second subcooling is extracted from the bottom of the vessel, or is subcooled, the first and/or second subcooling is carried out outside the first and second tanks and/or first and second vessels, the heat exchange during the first subcooling or the second subcooling between the first gas and the second gas is carried out so that a subcooling temperature of the first gas is between a first threshold value and a second threshold value, the outlet temperature of the second gas after the second subcooling is between −155° C. and −105° C. at a pressure of between 2 and 20 bars, the heated, vaporized or partially vaporized second gas is heated in order to supply the facility, the method additionally comprises a reliquefaction stage in which vapors of the first gas moving in a first circuit from the tank are reliquefied by heat exchange with the second gas in the liquid state having an inlet temperature and moving in a second circuit, the reliquefied vapors of the first gas being transferred into the tank and the second gas being maintained in the liquid state at an outlet temperature after the reliquefaction and taken back to the vessel, the heat exchange between the first gas and the second gas being carried out so that an outlet temperature of the reliquefied vapors of the first gas is between a first threshold value and a second threshold value, the vapors of the first gas are reliquefied when a pressure measured in the tank or vessel is greater than a second predetermined pressure threshold value of the tank or vessel, the second threshold value is, for example, between 1 and 1.05 bar absolute, the heated second gas is compressed so as to supply the facility, the first gas is a liquefied natural gas or a liquefied petroleum gas, the second gas is a liquefied natural gas, The present invention also relates to a gas treatment system of a gas storage facility, in particular on board a ship, the system comprising:

a tank or vessel in which a first gas in the liquid state is stored;

a first heat exchanger configured in order to carry out a first subcooling of the first gas extracted from the tank, in the liquid state, or vessel, by a first pipeline, and a second pipeline connected to the first heat exchanger emerges in the lower part of the tank or vessel or of another tank or vessel, so as to store the subcooled first gas at the bottom of the tank or vessel in order to form a reserve layer of cold of the first gas in the liquid state.

The device according to the invention can comprise one or more of the following characteristics, taken in isolation from one another or in combination with one another:

the first gas is stored in the same tank or the same vessel from which it is extracted, the device comprises a vessel in which a second gas in the liquid state is stored, the second gas having a boiling point less than or equal to that of the first gas, the second gas in the liquid state moves in a second pipeline connected to the first heat exchanger so as to carry out the first subcooling of the first gas, the device comprises a second heat exchanger configured in order to carry out a second subcooling of the first gas with the second gas in the liquid state, the bottom of the tank or vessel comprises an outlet connected to a first end of a conduit, the conduit comprising a second end coupled to a spray bar installed in the upper part of the tank or vessel, a heating device in which the second gas heated, vaporized or partially vaporized in the first heat exchanger moves, depressurization means are mounted upstream of the first heat exchanger, the second heat exchanger is configured so as to provide the second gas at an outlet temperature of between −155° C. and −105° C. at a pressure of between 2 and 20 bars, the device comprises a third heat exchanger configured in order to reliquefy at least a part of the vapors of the first gas by heat exchange with the second gas in the liquid state, the reliquefied vapors of the first gas being transferred into the tank and the second gas being maintained at the liquid state at an outlet temperature after the reliquefaction and taken back to the vessel, and in order for an outlet temperature of the vapors of the first gas to be between a first threshold value and a second threshold value, the device comprises a fourth heat exchanger configured in order to partially vaporize the second gas moving in a primary circuit and in order to subcool the second gas moving in a secondary circuit, the primary circuit is arranged downstream of the depressurization means and upstream of the first heat exchanger (in the direction of the movement of the fluid in the heat exchanger), the secondary circuit is arranged upstream of the second heat exchanger (in the direction of the movement of the fluid in the heat exchanger), a compressor is intended to compress the heated or vaporized second gas, the first gas is a liquefied natural gas or a liquefied petroleum gas, the second gas is a liquefied natural gas.

The invention also relates to a liquefied gas transport ship, comprising at least one system exhibiting any one of the abovementioned characteristics.

4. LIST OF THE FIGURES

Figure 2:
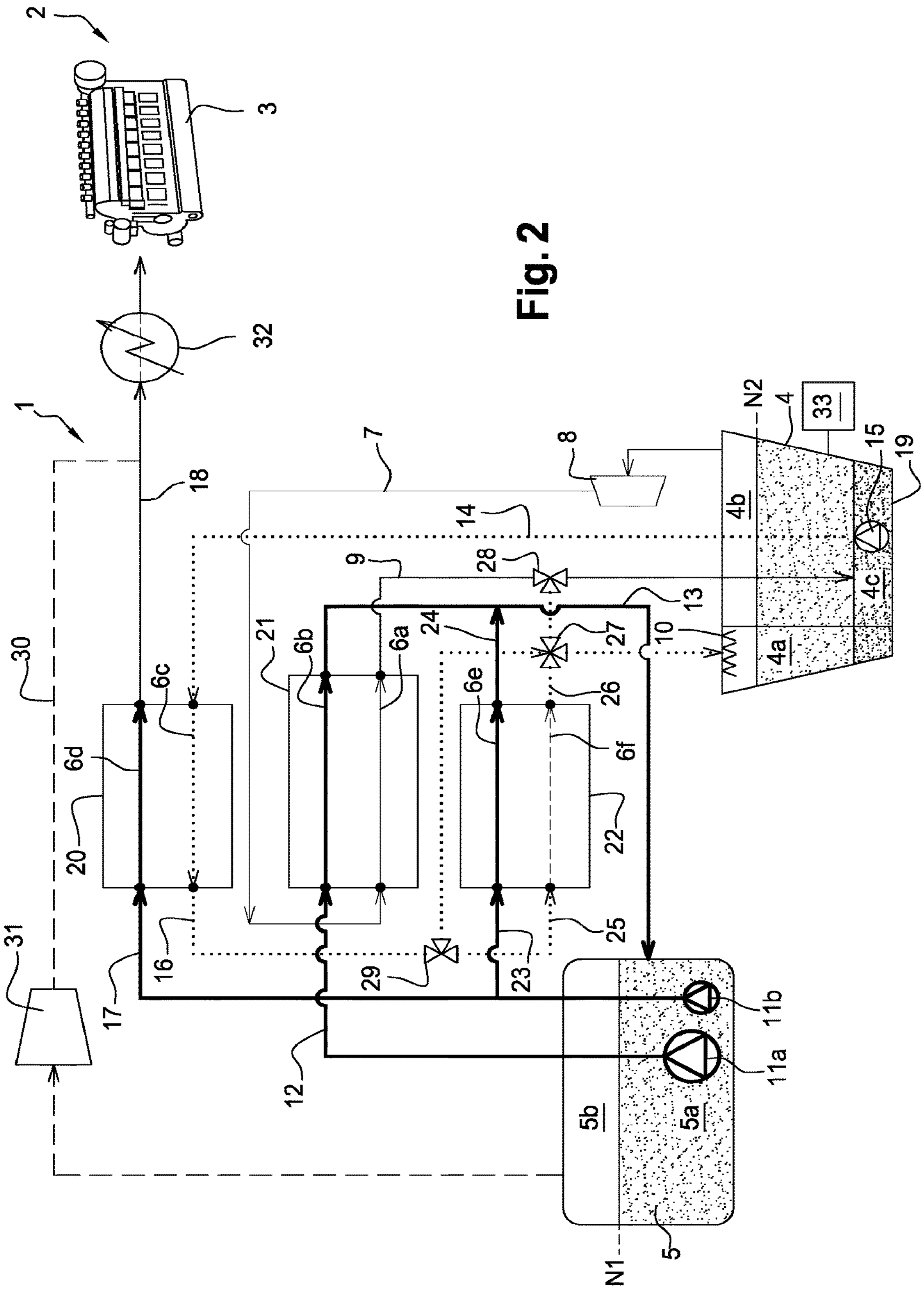
Figure 3:
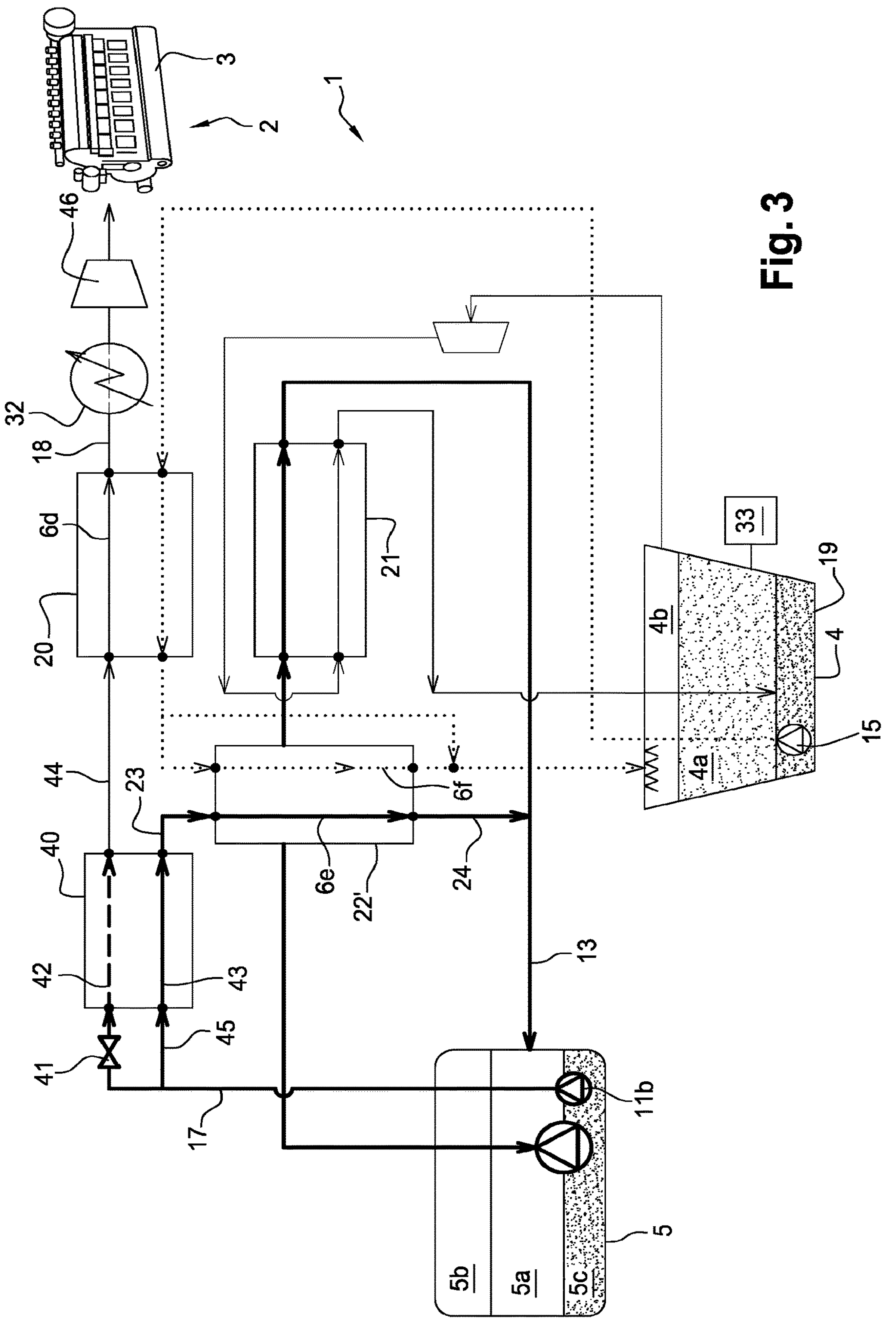
Figure 4:
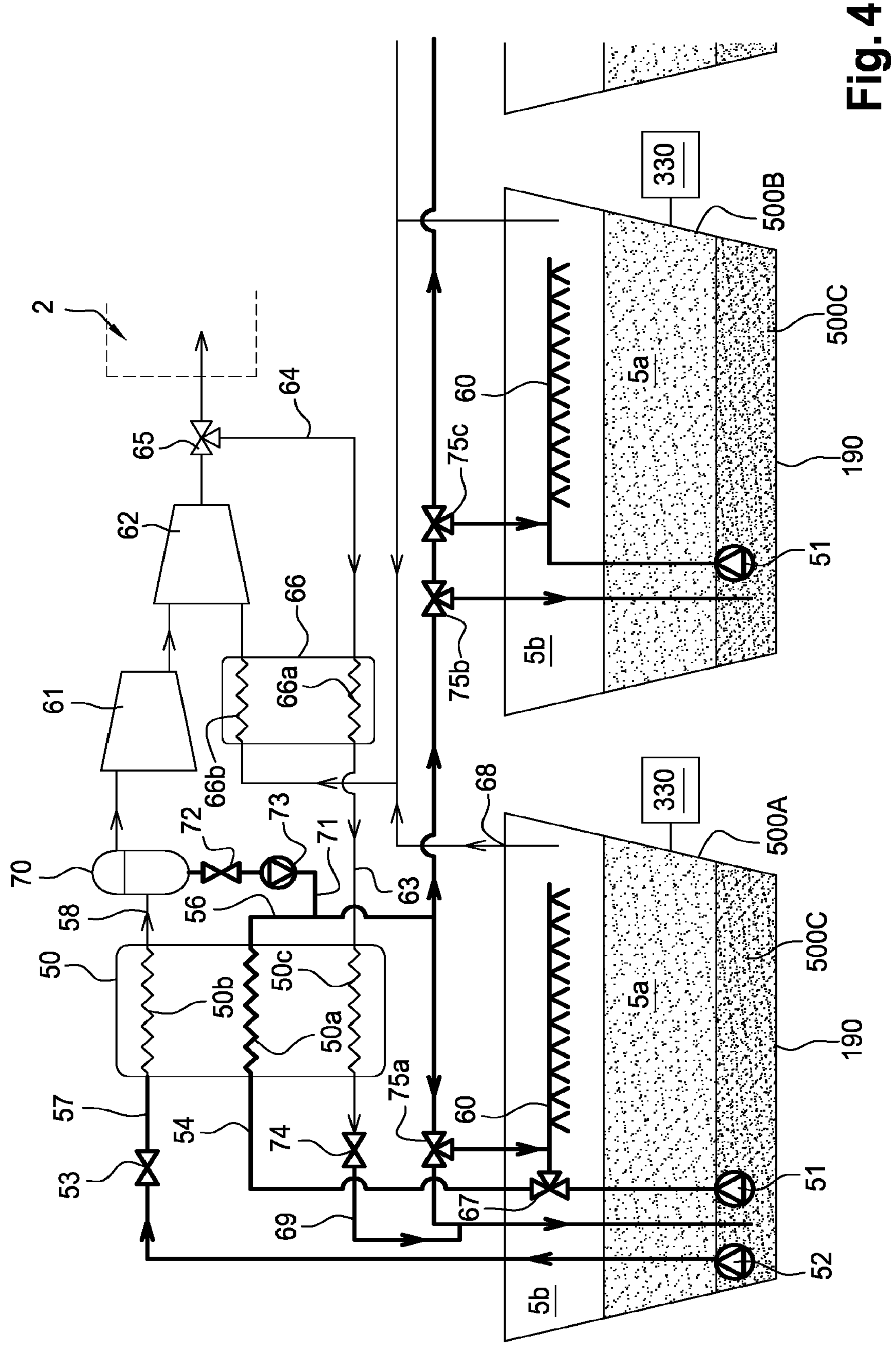
Figure 5:
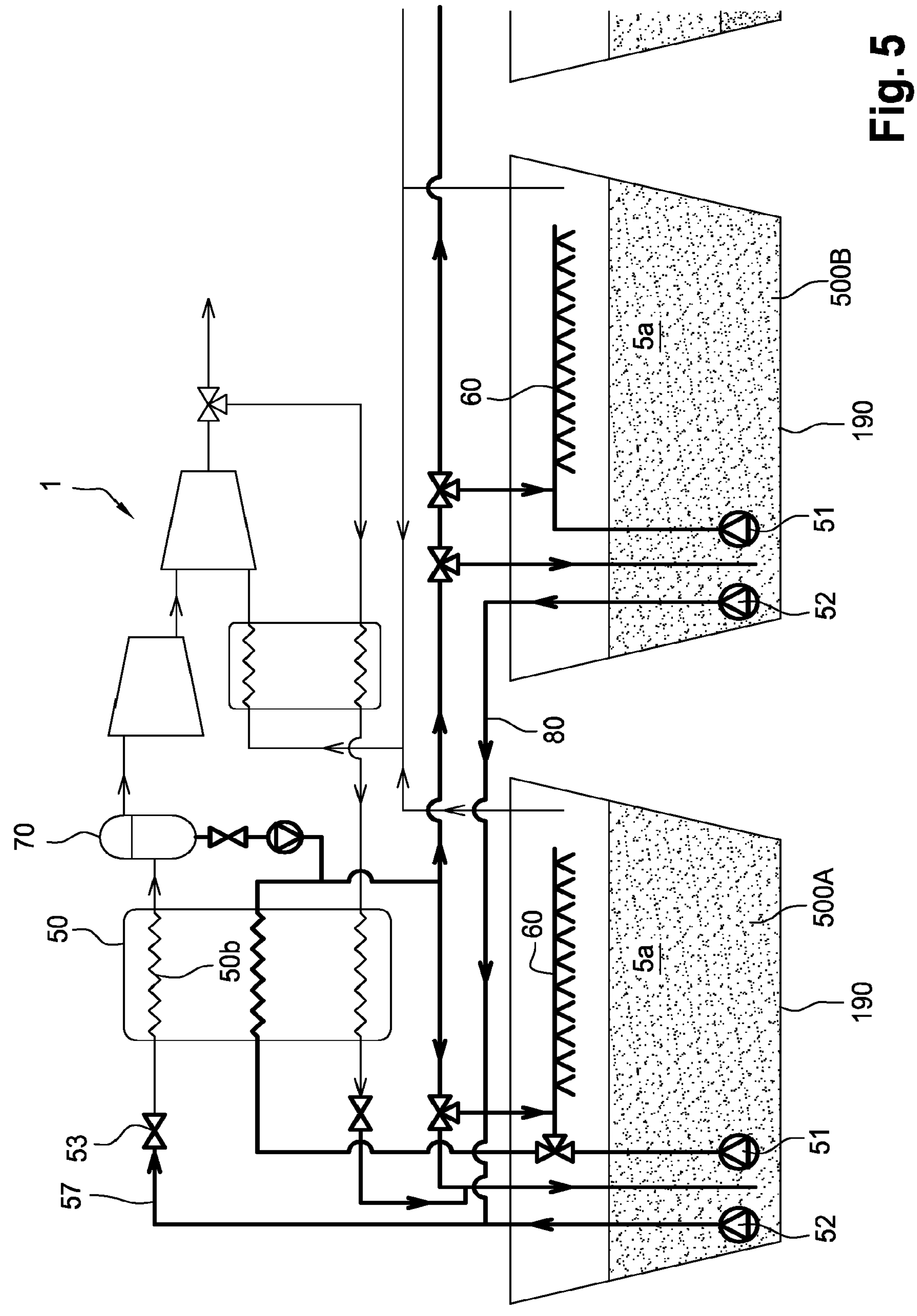
Figure 6:
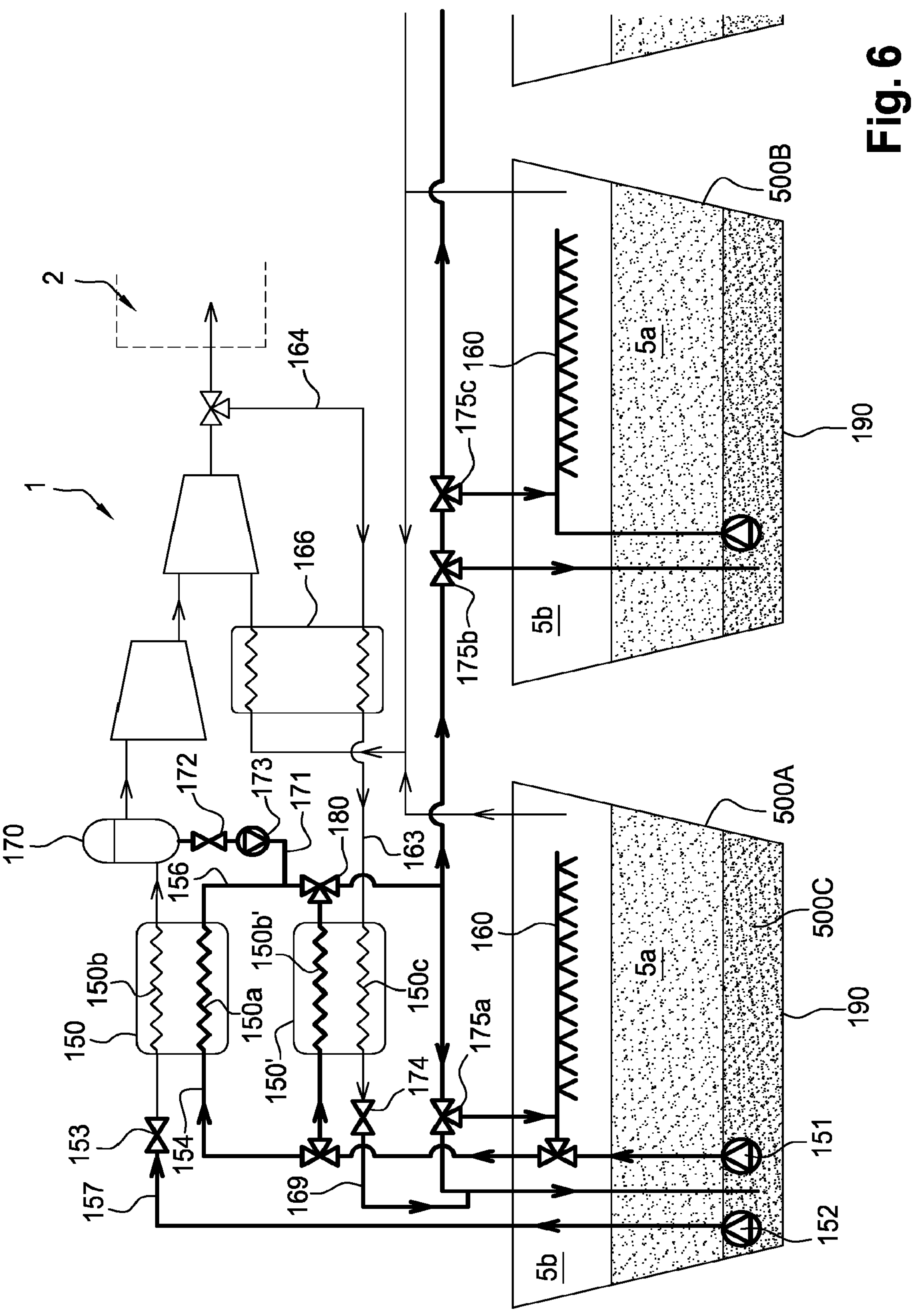

A better understanding of the invention will be obtained and other details, characteristics and advantages of the present invention will become more clearly apparent on reading the description which follows, given by way of nonlimiting example and with reference to the appended drawings, in which:

FIG. 1 represents an embodiment of a gas treatment system according to the invention which in this instance equips a gas storage facility, in particular on a ship, FIG. 2 represents another embodiment of a gas treatment system according to the invention, FIG. 3 represents another embodiment of a gas treatment system according to the invention, FIG. 4 illustrates another embodiment of a gas treatment system according to the invention, FIG. 5 is an alternative form of the embodiment of FIG. 4, and FIG. 6 illustrates another embodiment of a gas treatment system according to the invention.

5. DETAILED DESCRIPTION OF THE INVENTION

FIG. 1 shows a first embodiment of a gas treatment system 1 of a gas storage facility 2 according to the invention. This treatment system makes possible the cooling of one or more gases and/or a reliquefaction of vapors of one or more gases and/or the vaporization or heating of one or more gases.

In the present invention, the term "reliquefaction" is understood to mean the condensation of the vapors of a gas making it possible to bring it back to a liquid state.

In the present invention, the system 1 is installed on a ship, such as a gas transport ship, in particular of the VLGC (Very Large Gas Carrier) type. Ships of this type have a capacity of the order of 80 000 $m^3$.

In a gas transport ship, for example of the LNG tanker type, an energy production facility is provided in order to supply the energy needs of the operation of the ship, in particular for the propulsion of the ship and/or the production of electricity for the items of equipment on board.

The gas storage facility 2 can be the energy production facility. Such a facility commonly includes heat engines 3, such as the engine of the ship, which consumes gas originating from the gas cargo transported in the vessels/tanks of the ship.

On this ship, the gas(es) are stored in the liquid state in several tanks 4 or vessels 5 at very low temperature, indeed even at cryogenic temperatures. The tanks 4 and the vessels 5 can each contain a gas in the liquefied form or in the liquid state at a predetermined pressure and a predetermined temperature. One or more tanks 4 and/or vessels 5 of the ship can be connected to the facility 2 by the system 1 according to the invention. Each tank and vessel for this purpose comprises a jacket intended to isolate the gases stored at their storage temperature from the external environment.

The ship is loaded with natural gas (NG) stored in a vessel 5 and petroleum gases (PG) stored in one or more tanks 4. Each tank and/or vessel 4, 5 can have a capacity of between 1000 and 50 000 $m^3$. The number of tanks 4 and vessels 5 is not limiting. It is, for example, between 1 and 6. In the continuation of the description, the terms "the vessel" and "the tank" should be interpreted respectively as "the or each vessel" and "the or each tank".

Natural gas (NG) is, for example, methane or a gas mixture comprising methane. Natural gas is stored in the liquid state 5*a* in the vessel, for example at a cryogenic temperature of the order of −160° C. at atmospheric pressure. Natural gas in the liquid state or liquefied natural gas 5*a* bears the abbreviation "LNG". The vessel 5 also comprises gas vapors 5*b* resulting from an evaporation, in particular natural, of the LNG in the vessel. The evaporation or vapor 5*b* is denoted by the sign "BOG" or "NBOG" for natural evaporation, unlike "FBOG" for forced evaporation. The LNG 5*a* is stored, naturally, at the bottom of the vessel 5, while the LNG BOG 5*b* is located above the level N1 of LNG 5*a* in the vessel, known as gas headspace. The LNG BOG 5*b* in the vessel is due to the heat inputs from the external environment into the vessel 5 and to movements of the LNG 5*a* within the vessel 5 due to movements of the sea, for example.

Petroleum gas (PG) comprises propane, butane, propylene, ammonia, ethane, ethylene, or a gas mixture comprising these components. Petroleum gas is stored in the liquid state 4*a* in the tank 4 at a temperature of the order of −42° C. at atmospheric pressure. Petroleum gas in the liquid state 4*a* or liquefied petroleum gas bears the abbreviation "LPG". The tank 4 also comprises gas vapors 4*b* which result from an evaporation, in particular natural, of the LPG in the tank. Likewise, the LPG 4*a* is stored, naturally, at the bottom of the tank 4, while the LPG gas vapors are located above the level N2 of the LPG 4*a* in the tank, in the gas headspace. As was explained above for LNG, the evaporation of LPG (BOG or N BOG) in the tank 4 is also due to the heat inputs from the external environment into the tank, to fluid movements during voyages (sea, LPG), during the loading of the LPG into the tank 4 and during the cooling of the tank in order to bring the temperature of the tank back to an equilibrium temperature.

During the cooling, in this instance of the tank 4, which consists in bringing the ambient temperature of the jacket of the tank back to an equilibrium temperature, the liquefied gas is sprayed on the walls of the virtually empty tank. The evaporation of the gas generates the cold necessary for the cooling of the jacket. During this operation, which lasts about 10 h, there are very few LPG vapors produced by natural evaporation (NBOG) since the tank is virtually empty. On the other hand, the spraying of LPG on the walls in order to cool them generates a large amount of LPG vapors, of the order of 10 900 kg/h. This operation of cooling the LPG tanks can be applied to the cooling of LNG vessels.

During the loading of the LPG, the tank comprises a significant amount of BOG which originates from the cooling of the tank and also from the NBOG generated by the LPG which heats up in the tank. The vapors due to the cooling are not reliquefied by the LPG loaded into the tank. The loading operation lasts approximately 18 h. Approximately 13 900 kg/h of BOG is generated in the tank. The pressure in the tank is maintained above atmospheric pressure during the loading of the tank.

In the embodiment represented in FIG. 1, the system 1 represented comprises four LPG tanks 4 and one LNG vessel 5. The system 1 also comprises a heat exchanger 6 which makes possible heat exchanges between the LNG vapors 5*b*, the LPG vapors 4*b*, the liquid LPG 4*a* and the liquid LNG 5*a*. In the present example, the heat exchanger 6 comprises several circuits or pipes, in this instance at least one first circuit 6*a*, one second circuit 6*b*, one first pipe 6*c* and one second pipe 6*d*, in which NG or PG move in the liquid or vapor state.

The heat exchanger 6 is configured so that the first circuit 6*a* exchanges heat with the second circuit 6*b* in order to maintain the LNG coming from the vessel in the liquid state and to reliquefy LPG vapors 4*b* coming from the tank 4 simultaneously. The LNG at the outlet of the heat exchanger 6, in particular of the second circuit 6*b*, is sent to the vessel 5 and the reliquefied LPG vapors are sent to the tank 4.

For this, the tank 4 comprises an outlet which is connected to a first end of a first pipeline 7 in which LPG vapors 4*b* move. The outlet of the tank 4 is located in the upper part of the tank 4 where the gas headspace with the LPG vapors 4*b* (NBOG) is located. The first pipeline 7 is connected to an inlet of a compressor 8 which ensures the movement of the LPG vapors 4*b* in the first pipeline 7. The latter comprises a second end which is connected to an inlet of the first circuit 6*a*. The LPG vapors are intended to be reliquefied by heat exchange with the cold of the LNG and in order to keep the LNG in the liquid state. An outlet of the first circuit 6*a* is connected to a first end of a second pipeline 9 in which the reliquefied LPG vapors move. The second pipeline 9 comprises a second end which is immersed in the LPG or which is connected to a dip pipe 9*a* immersed in the tank. Alternatively, the second pipeline 9 is connected to an LPG spray bar 10. The bar 10 is arranged in the tank 4 and in the upper part of it, along a vertical axis in the plane of FIG. 1, so as to spray the reliquefied LPG vapors in the gas headspace of the LPG. This makes it possible to force the recondensation of the NBOG in the tank.

The system 1 comprises pumps which are installed in the vessel 5 in order to extract the LNG from it. In particular, a first pump 11*a* and a second pump 11*b* are immersed in the LNG, and are preferably located at the bottom of the vessel 5 in order to ensure that they are only supplied with LNG. The first pump 11*a* is connected to a first end of a third pipeline 12. The first pump 11*a* makes it possible to force the circulation of the LNG in the third pipeline 12. The flow rate by volume of the LNG of this first pump 11*a* is of the order of 130 $m^3$/h. The second end of this third pipeline 12 is connected to an inlet of the second circuit 6*b* in which LNG 5*a* coming from the vessel 5 moves. The second circuit 6*b* comprises an outlet connected to a first end of a fourth pipeline 13 in which LNG 5*a* also moves. The fourth pipeline 13 comprises a second end which is connected to the vessel 5. The third and fourth pipelines 12, 13 allow recirculation of the LNG from the vessel to the vessel through the heat exchanger 6. More precisely still, the second circuit 6*b* and the third and the fourth pipelines 12, 13 form a closed circuit. The LNG is extracted from the vessel at a temperature of −160° C. The outlet temperature of the LNG and/or the outlet pressure of the LNG are controlled in order for the LNG not to vaporize during the heat exchange with the LPG vapors. For this, a temperature sensor is provided, for example on the fourth pipeline 13, in order to control the temperature of the LNG returned to the vessel. Advantageously, the predetermined outlet temperature of the LNG is lower, for example by 5° C., than the evaporation temperature of the LNG at an authorized storage pressure value of the vessel, for example of the order of 8 bars. The storage pressure of the vessel 5 in order to contain the LNG is between 2 and 20 bars. The outlet pressure of the LNG from the heat exchanger 6 must be lower than the maximum storage pressure of the vessel. The LNG is thus heated without being vaporized. The outlet temperature of the reliquefied LPG vapors is between a first threshold value and a second threshold value. The first threshold value for outlet temperature of the LPG gas is substantially close to its liquefaction temperature at atmospheric pressure and the second threshold temperature is less than the first threshold value by 10° C. to 40° C. at atmospheric pressure. In the present example, the first threshold value is −40° C., whereas the second threshold value is of the order of −55° C. Advantageously, the outlet temperature of the reliquefied gas vapors is of the order of −42° C. This heat exchange allows the LPG vapors to be reliquefied at an appropriate temperature which is not too cold, in particular which is greater than or equal to a minimum temperature value which has to be withstood by the tank 4. The abovementioned temperature values for the LPG in this example and in the continuation of the description are examples of temperatures related to propane. It is understood that the temperature values of the other compounds of LPG apply to the invention.

The heat exchanger 6 is also configured so that the first pipe 6*c* exchanges heat with the second pipe 6*d* in order to carry out a forced evaporation of the LNG coming from the vessel and a subcooling of the LPG coming from the tank 4 simultaneously. In the present invention, the term subcooling is understood to mean a lowering of the temperature of the liquefied gas below its liquefaction temperature. The liquefied gas is, for example, subcooled by approximately 5° C. to 20° C. below its liquefaction temperature. It is understood that the storage of the subcooled liquefied gas, in the present invention, depends on the storage pressure of the liquefied gas. The vaporized LNG (FBOG) is intended to supply the facility 2 and in particular, in this instance, the engine of the ship. The subcooled LPG (in the liquid state) is sent to the tank 4. In particular, the first pipe 6*c* is configured in order to cause petroleum gas and in particular LPG 4*b* to move in the heat exchanger 6. The first pipe 6*c* comprises an inlet which is connected to one of the ends of a fifth pipeline 14 in which LPG extracted from the tank moves. The other end of the fifth pipeline 14 is connected to a third pump 15 immersed in the LPG. This third pump 15 is also installed in the bottom of the tank 4 in order to withdraw only LPG and to cause the LPG to move in this pipeline 14. The first pipe 6*c* comprises an outlet which is connected to a sixth pipeline 16 which is intended to return subcooled LPG (in the liquid state) to the tank 4. The sixth pipeline 16 can be connected to the spray bar 10 or to the second pipeline 9, or even to the dip pipe 9*a* for returning the LPG to the tank. Preferably, the subcooled LPG is stored at the bottom of the tank 4 in a reserve layer of cold 4*c* located in the interior space of the tank and in the lower part of the tank. This layer 4*c* can be used subsequently. Preferably, but nonlimitingly, the second end of the pipeline 9 or that of the dip pipe is located in the lower part of the tank 4, along a vertical axis in the plane of FIG. 1, in order to store the subcooled LPG therein. The subcooling takes place outside the tank or any other tank or vessel. The subcooling is not immersed in a liquefied gas, for example. In addition, the reserve layer of cold 4*c* is located in the interior space of the tank, at the bottom of the tank. The reserve layer of cold is below the LPG of the tank, along a vertical axis with respect to FIG. 1, forming a liquid-liquid interface. In other words, there is no partition, subtank or compartment in the tank which separates the LPG remaining/already in the tank and the subcooled LPG stored in this reserve layer.

The second pipe 6*d* makes possible vaporization of the LNG 5*a* coming from the vessel 5. For this, the second pump 11*b*, which is immersed in the LNG, is connected to a first end of a seventh pipeline 17 in which the LNG moves to the facility 2, in this instance the engine of the ship. The second pump 11*b* makes possible the movement of the LNG in the seventh pipeline 17 at a flow rate by volume lower than that of the first pump 11*a*. In the present example, the flow rate by volume of the LNG in the seventh pipeline 17 is of the order of 4 $m^3$/h. A second end of the seventh pipeline 17 is connected to an inlet of the second pipe 6*d*. The latter comprises an outlet which is connected to an eighth pipeline 18 in which LNG vapors 5*a* formed by heat exchange with the LPG move, in order to supply, for example, the engine of the ship. During this vaporization-subcooling heat exchange, the temperature of the LNG is raised. That is to say, its temperature is above its liquefaction temperature at atmospheric pressure. The temperature of the LNG is corrected by a heating device, not represented here, according to the specifications of the engine. The outlet pressure of the LNG, for example required by the engine of the ship, is of the order of 17 bars. As regards the LPG, its inlet temperature in the circuit 6*c* is approximately 1 bar. The outlet temperature of the subcooled LPG is greater than or equal to a minimum temperature value which has to be withstood by the tank or vessel. In this instance, the outlet temperature is of the order of −52° C. (at storage pressure in the tank).

In FIG. 1, the LPG vapors are extracted from a tank and the reliquefied LPG vapors are sent to another adjacent tank. Likewise, the LPG extracted from a tank and subcooled is returned to the same tank. Of course, other arrangements are possible.

In FIG. 1, the heat exchanger 6 is separate from the tanks or vessel. The heat exchanger 6 is positioned outside the tanks and vessels. The heat exchanger is not located in another tank or another vessel where liquefied gas is stored.

Advantageously, the heat exchanger is a tube-type, plate-type or coil-type exchanger.

In the embodiment illustrated in FIG. 2, the system 1 comprises several heat exchangers which allow heat exchanges between the LNG vapors, the LPG vapors, the LNGs and/or the LPGs. This system differs in particular from the first embodiment by the number of heat exchangers. In particular, in the present example, the system comprises at least two heat exchangers hereinafter referred to as evaporative heat exchanger 20 and main heat exchanger 21. In FIG. 2, a single vessel 5 and a single tank 4 are represented. Of course, the system can comprise other vessels and tanks. The system 1 also comprises the pumps 11*a*, 11*b* and 15 which are installed in the vessel 5 and in the tank 4. In particular, a first pump and a second pump are immersed in the LNG, and are preferably located at the bottom of the vessel in order to ensure that they are only supplied with LNG. The flow rate of the first pump is also approximately 130 $m^3$/h and the flow rate of the second pump is approximately 4 $m^3$/h.

The main heat exchanger 21 is configured in order to reliquefy the LPG vapors 4*b* by heat exchange with the cold of the LNG 5*a* and in order to maintain the LNG in the liquid state simultaneously. The LNG is returned to the vessel 5 without being vaporized and the reliquefied LPG vapors are returned to the tank 4. The main heat exchanger 21 comprises the first circuit 6*a* and the second circuit 6*b*. The first circuit 6*a* is connected, on the one hand, to the first pipeline 7 coupled to the tank 4 and, on the other hand, to the second pipeline 9 also coupled to the tank 4. A first compressor 8 is also provided on the first pipeline 7 in order to ensure the movement of the LPG vapors 4*b* in the pipeline to the heat exchanger 21.

The heat exchanger 20 is configured in order to vaporize the LNG coming from the vessel and to subcool the LPG coming from the tank 4 simultaneously. The LNG must undergo a forced evaporation in order to raise the temperature of the LNG to the temperature required, for example for the engine of the ship, which has to be supplied with LNG vapors. The heat exchanger 20 comprises the first pipe 6*c* and the second pipe 6*d*. The second pipe 6*d* is connected, on the one hand, to the seventh pipeline 17 connected to the vessel and, on the other hand, to the eighth pipeline 18 which transfers the LNG to the engine of the ship. The first pipe 6*c* is connected, on the one hand, to the first pipeline 14 coupled to the tank 4 and, on the other hand, to the sixth pipeline 16 coupled to the tank 4, and in particular at the bottom of the tank 4.

In FIG. 2, the system 1 also comprises a third heat exchanger referred to as auxiliary heat exchanger 22. The latter makes possible a second subcooling of the LPG with the cold of the LNG and makes it possible to maintain the LNG in the liquid state. The LNG in the liquid state is returned to the vessel and the subcooled LPG is returned to the tank.

Advantageously, but nonlimitingly, the heat exchangers 20, 21, 22 are separate from the tanks and vessels.

Advantageously, but nonlimitingly, the heat exchangers 20, 21, 22 are tube-type, plate-type or coil-type exchangers.

The auxiliary heat exchanger 22 comprises a third circuit 6*e* in which LNG moves and a fourth circuit 6*f* in which LPG, in particular sub-cooled LPG, moves. The third circuit 6*e* comprises an inlet coupled to a ninth pipeline 23 which is connected to the vessel 5. As can be seen in FIG. 2, the ninth pipeline 23 is a bypass portion of the seventh pipeline 17 which extracts the LNG from the bottom of the vessel 5 by means of the pump 11*b*. The third circuit 6*e* comprises an outlet which is connected to a tenth pipeline 24 which returns the LNG maintained in the liquid state to the vessel 5. In this implementational example, the tenth pipeline 24 is coupled to a portion of the fourth pipeline 13 returning the LNG to the vessel 5, for example by a valve, such as a three-way valve. The fourth circuit 6*f* comprises an inlet which is coupled to an eleventh pipeline 25 in which LPG extracted from the bottom of the tank moves. The eleventh pipeline is in this instance coupled to the pipeline 16 in which subcooled LPG moves and by a valve 29, such as a three-way valve. The fourth circuit 6*f* comprises an outlet which is coupled to a twelfth pipeline 26 which is connected to the tank. According to this implementational example, the twelfth pipeline 26 is coupled to a portion of the tenth pipeline or to the pipeline 9. The LPG subcooled by heat exchange with the LNG is sprayed into the gas headspace or is stored at the bottom of the tank 4 in the reserve layer of cold 4*c*. The twelfth pipeline 26 can be connected to the pipeline 16 by a valve 27. Likewise, the pipeline 26 can be connected to the pipeline 9 by a valve 28. Preferably, but nonlimitingly, the valve(s) 27, 28 are three-way valves. The pipeline 16 is connected to an LPG spray bar 10 in order to spray LPG droplets into the gas headspace of the tank 4 and to force the recondensation of NBOG in the tank 4. The third pump 15 is configured in order to force the movement of LPG in the pipeline(s) 14, 16, 25 from the bottom of the tank as far as the spray bar 10. Due to this configuration, the subcooled LPG is transferred directly into the tank or to the bar 10 or is transferred to the auxiliary heat exchanger 22 for a second subcooling with LNG.

In FIG. 2, the system additionally comprises a pipe 30 for extracting the LNG vapors 5*b* in the vessel 5 so as to control the pressure of the vessel 5 and to supply the facility 2 with fuel gas. A second compressor 31 is mounted on this pipe 30 in order to ensure the movement of the LNG vapors 5*a* to the engine and to maintain the pressure in the vessel. This pipe 30 is connected to the portion of pipeline 18 where heated or vaporized LNG moves to the engine of the ship.

Advantageously, but nonlimitingly, a heating device 32 is positioned upstream of the facility so as to adjust the temperature of the LNG to the required temperature and to ensure that all the LNG is vaporized. The heating device 32 is in this instance a heater.

In a third embodiment of the invention illustrated in FIG. 3, the system 1 also comprises several heat exchangers. In particular, the system 1 comprises:

- the main heat exchanger 21, which is configured in order to reliquefy the LPG vapors 4*b* by heat exchange with the cold of the LNG 5*a* and in order to maintain the LNG in the liquid state,
- the evaporative heat exchanger 20, which is configured in order to vaporize the LNG coming from the vessel 5 and to subcool the LPG coming from the tank 4, and
- the auxiliary heat exchanger 22', which is configured in order to subcool the LPG and to maintain the LNG in the liquid state.

The system 1 of this embodiment differs from the embodiment illustrated in FIG. 2 in that it comprises a fourth heat exchanger 40 arranged upstream of the heat exchanger 20. The heat exchanger 40 is preferably, but nonlimitingly, a vacuum evaporator (VE) intended to generate cold. The vacuum evaporator 40 comprises a primary circuit 42 which comprises an inlet and an outlet. The inlet is connected to the seventh pipeline 17 in which LNG coming from the vessel moves. The outlet of the primary circuit 42 is connected to a first end of a pipeline 44. The latter comprises a second end which is connected to the inlet of the circuit 6*d* of the heat exchanger 20. Depressurization means 41 are provided on the pipeline 17 and upstream of the vacuum evaporator 40. The depressurization means 41 make it possible to obtain a gas in a two-phase liquid-vapor state by lowering the pressure and the temperature of the gas. The depressurization means 41 comprise in this instance an expansion valve, such as a Joules-Thomson valve. The LNG which enters the depressurization means 41 is at a temperature of the order of −134° C. and at a pressure of the order of 8 bars. At the outlet of the expansion valve, the LNG is cooled to a temperature of approximately −160° C. at a pressure of the order of 1 bar. The two-phase LNG enters the vacuum evaporator 40 where a heat exchange is carried out with LNG extracted from the vessel. More specifically, the vacuum evaporator 40 comprises a secondary circuit 43 which comprises an inlet and an outlet. The inlet of the secondary circuit 43 is connected to a bypass pipeline 45 in which LNG coming from the vessel 5 moves. This bypass pipeline 45 comes from the seventh pipeline 17 coupled to the pump 11*b*. Of course, the pipeline 45 might be connected to another pump immersed at the bottom of the vessel. The outlet of the secondary circuit is connected to the pipeline 23 returning the LNG to the bottom of the vessel 5. In this embodiment, the pipeline 23 is coupled to the inlet of the circuit 6*e* of the heat exchanger 22'. In this vacuum evaporator 40, the LNG moving in the secondary circuit 43 is subcooled by recovering the latent heat of the two-phase LNG moving in the circuit 42. The subcooled LNG (in the liquid state) is transferred into the vessel. The two-phase LNG moving in the primary circuit 42 is heated or vaporized and then transferred to the evaporative exchanger 20. The outlet temperature of the LNG at the outlet of the primary circuit 42 is between −160° C. and −134° C. at a pressure of the order of 1 bar. The outlet temperature of the subcooled LNG is of the order of −160° C. at a pressure of between 2 and 20 bars, When the subcooled LNG moves through the heat exchanger 22', the latter is configured in order to maintain the LNG coming from the vacuum evaporator 40 in the liquid state. This is because the LNG coming from the circuit 43 can exchange heat with subcooled LPG coming from the heat exchanger 20 according to an operating mode of the system described below. In this case, the LNG passing through the circuit 6*e* is heated but not vaporized.

In FIG. 3, the system 1 additionally comprises a compressor 46 which is installed downstream of the heating device 32. This compressor 46 makes it possible to compress the vaporized LNG to the pressure required by the facility 2.

In this implementational example, the subcooling is carried out outside the tanks and the vessel. In other words, the heat exchangers are separate from the tanks and the vessel.

In a first operating mode (COOLING) of the system 1 for treatment of the gases for the energy production facility 2, as illustrated in FIG. 2, LNG is used to reliquefy the LPG vapors 4*b*. LNG is also used to supply the facility 2, in particular the engine of the ship and the other heat engines for energy production needs. This first operating mode is operated during the cooling of the LPG tank. This is because, as was explained above, a very large amount of LPG vapor 4*b* is generated during this operation (approximately 10 900 kg/h). This amount of vapor 4*b* generated is greater than the amount of vapor 4*b* (NBOG) generated during the voyage of the ship in order to transport the LPG. In the context of the cooling of the walls of the tank, the energy requirements of the engine with fuel gas are very low. The consumption of the facility 2 is of the order of 500 kg/h in LNG vapor. The system uses the main heat exchanger 21 to manage the LPG vapors 4*b* generated during the cooling. The LPG vapors 4*b* are extracted from the tank 4 by the compressor 8, which moves them in the first pipeline 7. The LPG vapors 4*b* moving in the first circuit 6*a* are reliquefied by the cold of the LNG moving in the second circuit 6*b* via the third pipeline 12 from the bottom of the vessel 5. It is understood that the LNG which is at the bottom of the vessel is cooler than the LNG close to the surface N1, i.e. at the interface between the LNG and the gas headspace. Following the reliquefaction, the reliquefied LPG vapors are transferred into the tank 4 and the LNG is maintained in the liquid state and then taken back to the vessel 5. The LPG vapors 4*b* enter the main heat exchanger 21 at a temperature of the order of 0° C. and at a pressure close to atmospheric pressure. The main heat exchange 21 is carried out so that the outlet temperature of the reliquefied LPG vapors is between a first threshold value and a second threshold value. The first and the second threshold values are considered at a pressure equal to or greater than atmospheric pressure. These temperature threshold values are greater than or equal to a minimum temperature value withstood by the tank 4. Advantageously, the first threshold value for outlet temperature of the LPG vapors 4*b* is −40° C. at a pressure equal to or greater than atmospheric pressure and the second threshold value for outlet temperature of the reliquefied LPG vapors is of the order of −50° C. at a pressure equal to or greater than atmospheric pressure. Preferably, but nonlimitingly, the outlet temperature of reliquefied LPG vapors is −42° C. at a pressure equal to or greater than atmospheric pressure. In this way, the heat exchange is controlled in order for the reliquefied LPG vapors not to be too cold.

Likewise, the heat exchange is carried out so that the outlet temperature of the LNG after the reliquefaction is between a first temperature threshold value and a second temperature threshold value at a pressure of between 6 and 20 bars. As was seen during the first embodiment in connection with FIG. 1, the LNG must be heated but not vaporized. The main heat exchanger 21 is configured in order for the temperature difference between the inlet temperature of the LNG before the reliquefaction and the outlet temperature of the LNG after the reliquefaction to be between 5° C. and 55° C. Preferably, but nonlimitingly, this temperature difference is 26° C. In this instance, the LNG enters the main heat exchanger 21, before the reliquefaction, at an inlet temperature of the order of −160° C. and at a pressure of between 2 and 20 bars. The first threshold value is of the order of −155° C. and the second threshold value is of the order of −105° C. Preferably, but nonlimitingly, the outlet temperature of the LNG is less than its vaporization temperature and at a pressure less than a maximum authorized storage pressure of the vessel. The temperature is of the order of −134° C. Such values make it possible to transfer a maximum of LNG cold to the LPG vapors for the reliquefaction while preventing the LNG which returns to the vessel from being too hot and the reliquefied LPG vapors from being too cold. An excessively hot LNG might cause an increase in LNG pressure in the vessel and exceed the authorized limits. Thus, the main heat exchanger 21 is adjusted in order for the LNG and the reliquefied LPG vapors to respectively exit at the temperature required in the vessel or the tank. During the heat exchange, the LNG flow rate and the LPG vapor flow rate are respectively constant.

Since the inlet and outlet temperatures of the LNG and of the LPG are known and/or predetermined, parameters such as the flow by weight of the LNG and of the LPG make it possible to configure the heat exchanger 21 for the heat exchange.

The system can operate so that the reliquefaction of the LPG vapors is carried out when the pressure measured in the tank is greater than a predetermined pressure value in the tank.

In this first operating mode, the system 1 also uses the evaporative exchanger 20 in which LPG coming from the tank 4 and LNG coming from the vessel 5 move in order to supply the facility 2. The heat exchange between the LPG and the LNG allows the subcooling of the LPG and the vaporization or heating of the LNG intended to supply the facility 2. The subcooled LPG (in the liquid state) is stored in the lower part of the tank so as to constitute a subsequent reserve layer of cold 4*c*. This makes it possible to obtain a greater available refrigerating power and thus to improve the efficiency of the cooling of the gas, liquefied and/or in the gas form, contained in the tank. In the present invention, the lower part of the tank 4 extends over approximately less than 30% of the height of the tank 4, measured from its bottom 19. The bottom 19 is the lowermost end of the tank, for example closer to the hull of the ship when the tank is transported on the LNG tanker. In particular, the LPG extracted from the bottom of the tank by the pump passes through the heat exchanger 20, where its inlet temperature is approximately −42° C. The inlet temperature of the LNG extracted from the vessel is approximately −160° C. at a pressure of approximately 17 bars. After the heat exchange, where the LPG recovers the latent heat of the LNG which vaporizes, the outlet temperature of the LPG is between −45° C. and −55° C. The subcooled LPG is transferred to the bottom of the tank where it is thus stored in the layer 4*c* at a temperature of between −45° C. and −55° C. Advantageously, the subcooled LPG is at approximately −52° C. (storage pressure in the tank). After the heat exchange, the vaporized or heated LNG is at an outlet temperature of approximately 0° C., where it can further be heated by the heating device 32.

Alternatively, the storage of the subcooled LPG is a function of the pressure in the tank. In particular, when the pressure in the tank is less than a first predetermined pressure value, for example between 1 and 1.05 bar absolute, the system controls the storage of the subcooled LPG in the reserve layer of cold. For this, pressure determination means 33 make it possible to determine the pressure inside the tank 4. The pressure determination means 33 comprise in this instance a pressure sensor installed in or near the tank 4.

The LPG in the tank 4 which is above this reserve layer of cold 4*c*, for example remaining in the tank, is at a temperature greater than −42° C. It is considered that the LPG tank comprises several layers in which the LPG is at different temperatures, the coldest layers being at the bottom of the tank.

In a second operating mode (VOYAGE) of the system for treatment of the gases for the energy production facility 2, as illustrated in FIG. 2, the LNG is used to supply the facility 2, such as the engine of the ship, and the LPG is subcooled so as to form a reserve of cold LPG which will be used subsequently to cool the LPG vapors in the tank. This operating mode is operated during the voyage of the ship, where a lesser amount of LPG vapors has to be managed. This is because the LPG gas vapors (N BOG) generated are of the order of 2700 kg/h, whereas the engine of the ship, for example, consumes a small amount of fuel gas, of the order of 2000 kg/h. In this operating mode, the system uses at least the evaporative heat exchanger 20, in which LPG coming from the tank and LNG coming from the vessel move, in order to carry out a forced evaporation of LNG which has to supply the engine of the ship, and the auxiliary heat exchanger 22, in order to constitute the reserve of cold. The LNG is extracted from the vessel via the second pump 11*b*. The inlet temperature of the LNG in the second pipe 6*d* is of the order of −160° C. The LPG is extracted from the tank containing the LPG by means of the pump 15. The LPG moves in the second pipeline to the evaporative exchanger and enters the latter at a temperature of approximately −42° C. The LPG undergoes a first subcooling of the LPG by recovering the cold from the LNG which vaporizes by heat exchange in the exchanger 20. The heat exchange between the LPG and the LNG is carried out so that the subcooling temperature of the LPG is between a first threshold value and a second threshold value at atmospheric pressure. The evaporative exchanger 20 is configured in order to transfer a maximum amount of heat but is limited by the temperature difference between the LNG and the LPG. Advantageously, but nonlimitingly, the first threshold value is of the order of −40° C. and the second threshold value is of the order of −55° C. The subcooled LPG is stored in the lower part of the tank so as to constitute the LPG reserve layer of cold or sprayed into the gas headspace by the bar 10. On a voyage, the outlet temperature of the LPG of the heat exchanger 20 is of the order of −52° C.

Of course, as was seen for the first operating mode, when the pressure in the tank is less than the first predetermined pressure threshold value, for example between 1 and 1.05 bar absolute, the subcooled LPG is stored in the reserve layer of cold.

It is considered that a reserve layer of cold has already formed, for example, during the cooling of the tank. This subcooled LPG is then used to cool or condense the LPG vapors in the tank. For this, the subcooled LPG is extracted from the reserve layer of cold 4*c* and is sprayed into the gas headspace via the bar 10. Alternatively, the LPG from the reserve layer of cold 4*c* is extracted from an outlet of the tank which is coupled to a conduit which is connected to the bar or to a heat exchanger through which the LPG vapors pass. It is thus not necessary to start up the auxiliary heat exchanger in order to create a reserve of cold.

The LNG at the exit of the exchanger 20 is vaporized or heated by the heat exchange between the LPG and the LNG. This vaporized or heated LNG is transferred to the engine for its supply. The LNG vapors which are extracted from the vessel also make it possible to supply the engine. The vaporized or heated LNG and the LNG vapors are heated so that all the LNG is vaporized before supplying the engine.

In a third operating mode (LOADING) of the system for treatment of the gases for the energy production facility, as illustrated in FIG. 2, the LNG is used to supply the engine of the ship and for the energy production needs, as well as to reliquefy the LPG vapors. This operating mode is operated in particular during the loading of the LPG into the tank, where a large amount of LPG vapors is produced, for example approximately 13 900 kg/h. The energy needs of the facility 2 are low, approximately 500 kg/h. In this operating mode, at least two heat exchangers are appealed to in order to treat all the LPG vapors. In particular, the system uses the main heat exchanger 21 to manage the LPG vapors generated during the loading of the LPG and the evaporative heat exchanger 20 to vaporize or heat the LNG intended to supply the facility 2. The heat exchangers 20, 21 thus operate in a similar manner to the first operating mode in the case of the cooling of the tank.

In this operating mode, it may be that the main heat exchanger 21 does not make it possible to manage the pressure in the tank 4 due to the large amount of LPG vapor generated. In this scenario, when the pressure measured (by virtue of the means for determining the pressure 33) inside the tank reaches or is greater than a second predetermined threshold pressure value, the auxiliary heat exchanger 22 is activated. Thus, the purpose of the auxiliary heat exchanger 22 is to manage the pressure inside the tank 4. LNG is withdrawn from the vessel so as to exchange with the subcooled LPG. The subcooled LPG after the first subcooling is at a temperature of the order of −42° C. This temperature of −42° C. is due to the fact that a small amount of LNG moves in the heat exchanger 20, in particular in the second pipe 6*d*. This is because it is the engine or the facility 2 which determines the flow rate of LNG which has to be vaporized in the second pipe 6*d*. Given that the needs of the facility 2 are low, a very small amount of LNG is available to carry out the subcooling of the LPG. The facility controls the flow rate of the second gas which has to be vaporized or heated during the vaporization. This implies that the amount of heat from LNG is not enough to substantially reduce the temperature of the LPG. As the temperature of the LPG at the outlet of the heat exchanger 20 is not cold enough, the heat exchanger 22 carries out a second subcooling of the LPG. The LNG is extracted from the vessel, at a temperature of approximately −160° C., and exchanges heat with LPG which has been subjected to a first subcooling, in this instance in the heat exchanger 20. The inlet temperature of the subcooled LPG is of the order of −42° C. The outlet temperature of the LPG subcooled a second time is less than or equal to a threshold temperature value which has to be withstood by the tank 4. The outlet temperature of the LPG is of the order of −52° C. This LPG is stored in the reserve layer of cold for subsequent use or is sprayed into the gas headspace of the tank in order to condense or cool the LPG vapors 4*b* in the tank. The outlet temperature of the LNG is approximately −134° C. at a pressure of the order of 8 bars. The LNG is thus hot but not vaporized.

In a fourth operating mode (hot LNG in the vessel), the system 1 for treatment of gases for the energy production facility, as illustrated in FIG. 2, the system makes it possible to manage the risk of heating of the LNG in the vessel in the case where the main heat exchanger 21 has operated (during the loading of LPG in the tank or during the cooling of the tank). This is because the LNG at the outlet of the main exchanger and or at the outlet of the auxiliary heat exchanger is hot, i.e. at an outlet temperature of the order of −134° C. This operating mode employs the system as represented in FIG. 3 and mainly in voyage mode in order to cool the LNG in the vessel to its cryogenic temperature. The system 1 uses at least the heat exchanger 40 where the partially vaporized LNG makes it possible to subcool the LNG which is transferred to the vessel. It is then considered that the LNG stored in the vessel is at a temperature of approximately −134° C. at a pressure of the order of 8 bars. The LNG is extracted from the vessel by the second pump 11*b*. The LNG moves in the circuit 42 where it was depressurized and then partially vaporized. The inlet temperature of the partially vaporized LNG in the heat exchanger 40 is of the order of −160° C. at atmospheric pressure. The outlet temperature of the vaporized LNG is between −134° C. and −160° C. at atmospheric pressure. The inlet temperature of the LNG in the heat exchanger, in the second pipe 43, is of the order of −134° C. and its outlet temperature is of the order of −160° C. The subcooled LNG is transferred into a reserve layer of cold 4*c* in the lower part of the vessel 5. The heat exchanger 20 subcools the LPG and vaporizes the LNG at the outlet of the heat exchanger 40.

When the pressure measured in the tank 4 is greater than or equal to the threshold pressure value, the heat exchanger 22' is activated in order to subcool a second time the LPG which was cooled in the exchanger 20. The LPG is subcooled with the LNG which was subcooled in the heat exchanger and passes through the heat exchanger 22'. The outlet temperature of the LNG after the heat exchange in the exchanger 22' is of the order of −134° C. at atmospheric pressure.

These above operating modes have been described on the basis of FIG. 2. It is, of course, possible for FIG. 1 to apply to these operating modes.

FIG. 4 illustrates another embodiment of the gas treatment system 1 according to the invention. The system comprises LNG vessels each comprising LNG vapors 5*b* and LNG. In this instance, two LNG vessels are represented. Pumps are also immersed in the LNG of a main vessel and a single pump is immersed in the LNG of the adjacent vessel. Each pump is preferably installed at the bottom of the vessel. The system 1 comprises a heat exchanger 50 which is configured in order to subcool LNG coming from the LNG vessel, in this instance first tank 500A, intended to be stored at the bottom 190 of the same first vessel 500A so as to constitute a reserve layer of cold 500*c* at the bottom of the vessel 500A. The layer 500*c* is located in the interior space of the vessel. The heat exchanger comprises at least one first pipe 50*a* and one second pipe 50*b*. The first pipe 50*a* comprises an inlet which is coupled to the first end of a pipeline 54. The second end of the pipeline 54 is connected to a first pump 51 mounted at the bottom of the first vessel 500A. This pipeline 54 is also connected to a spray bar 60 mounted in the vessel 500A via a three-way valve 67. The bar 60 is arranged in the upper part of the vessel and preferably in the LNG gas headspace. The first pipe 50*a* comprises an outlet which is coupled to a pipeline 56 which is connected to the bottom of the vessel 500A. The pipeline 56 is also connected to the spray bar 60 by a three-way valve 75*a*. As is illustrated in FIG. 4, the pipeline 56 emerges in the bottom of the adjacent vessel, second vessel 500B, by a three-way valve 75*b*, as well as at another bar 60 of this second vessel 5008 by a three-way valve 75*c*. The second pipe 50*b* comprises an inlet connected to the vessel 500A by a pipeline 57. One of the ends of the pipeline 57 is connected to a second pump 52 mounted at the bottom of the vessel 500A. The outlet of the second pipe 50*b* is connected in this instance to an inlet of a drum 70 via a pipeline 58. The outlet of the drum 70 is connected to the pipeline 56 by a first outlet, via a pipe 71. The pipe 71 comprises, for example, a valve 72 and a pump 73. Depressurization means 53 are mounted on the pipeline 57, upstream of the heat exchanger 50. This exchanger, as in the embodiment illustrated in FIG. 3, is a vacuum evaporator. The depressurization means 53 comprise, for example, an expansion valve (Joule-Thomson valve).

The second pipe 50*b* is a cold circuit, the depressurized LNG being intended to be heated by movement in this circuit so as to carry out a forced evaporation (to give FBOG). The first pipe 50*a* is a hot circuit, the LNG coming from the vessel 500A being intended to be cooled by movement in this circuit. The first pipe 50*a* may not, however, make it possible to vaporize the heaviest components (ethane, propane, and the like). It is understood that the depressurization upstream of the second pipe 50*b* makes it possible to lower the vaporization temperature, which makes it possible to generate FBOG from a heat exchange with the LNG withdrawn from the vessel 500A and moving in the first pipe 50*a*. The vaporization to give FBOG requires a contribution of heat supplied by the LNG moving in the first pipe 50*a*; it is thus a refrigerating source for the purpose of the subcooling of the LNG moving in the first pipe 50*a*.

LNG originating from the vessel 500A is thus conveyed by the pump 52 as far as the depressurization means 53 and then moves in the second or cold pipe 50*b* of the exchanger 50. The LNG downstream of the depressurization means is at a temperature of −168° C. and at an absolute pressure of 400 mbar. In the meantime, the LNG of the vessel 500A is conveyed by the pump 51 as far as the first or hot pipe 50*a* of the exchanger 50. Consequently, the exchange of heat between these circuits leads to:

- the heating of depressurized and partially vaporized LNG, for the purpose of continuing its vaporization, which is subsequently conveyed as far as the drum 70 in the present example, and
- the subcooling of LNG which supplies the bottom of the first vessel and or of the second vessel, in order to be stored therein for the purpose of subsequent use, or which is sprayed into the LNG gas headspace via the bar 60.

The outlet temperature of the LNG after the heat exchange in the pipe 50*a* is of the order of −168° C.

The storage of LNG in the reserve layer of cold can be a function of the pressure inside the vessel. For example, when the pressure measured (with a pressure sensor 330) in the vessel is less than a predetermined pressure threshold value in the vessel, the subcooled LNG (in the liquid state) is stored in this reserve layer of cold 500*c*.

The drum 70 is thus intended to be supplied with LNG in a two-phase liquid-vapor state originating from the vessel 500A via the heat exchanger 50. The operating pressure inside the drum 70 is less than the storage pressure of the LNG inside the vessel 500A. Supplying the drum 70 with LNG can lead to additional vaporization of the LNG, which is reflected, on the one hand, by the generation of FBOG in the drum 70, as well as the subcooling of the LNG remaining in the drum. The drum makes it possible to separate the phases with the LNG stored in the lower part of the drum and the LNG vapors in the upper part of it. The subcooled LNG at the outlet of the drum is at an outlet temperature of the order of −168° C. The drum 70 comprises a second outlet which is arranged in the upper part of it, where the LNG gas vapors (FBOG) are naturally stored. The outlet of the drum 70 is connected to the facility 2 via, in this instance, two compressors 61, 62.

The heat exchanger 50 also comprises a third pipe 50*c* which comprises an inlet and an outlet. The inlet of the third pipe 50*c* is connected to a first end of a pipeline 63 in which reliquefied LNG gas vapors move. In particular, the outlet of the compressor 62 is connected to the facility 2 for the purpose of supplying it with fuel gas. Part of the fuel gas exiting from the compressor 62 can be withdrawn and rerouted by a pipeline 64 which can be connected to the outlet of the compressor 62 by a three-way valve 65. The compressor 62 is configured in order to compress the gas (such as NBOG originating from the first vessel and/or second vessel) to a working pressure suitable for its use in the facility 2. The pipeline 64 is connected to an inlet of a primary circuit 66*a* of a heat exchanger 66. The primary circuit comprises an outlet which is connected to a second end of the pipeline 63. Each vessel 500A, 500B comprises an outlet 68 for LNG vapors 5*b* which is connected to an inlet of a secondary circuit 66*b* of the heat exchanger 66. The secondary circuit 66*b* comprises an outlet which is connected to the inlet or to one of the inlets of the compressor 62. The third pipe 50*c* comprises an outlet which is connected to the pipeline 56 by another pipeline 69. An expansion valve 74 is installed on this pipeline 69 in order to reduce the temperature of the gas by adiabatic expansion.

The LNG vapors coming from a vessel 500A, 500B are heated in the secondary circuit 66*b* so as to supply the facility 2, and the LNG vapors at the outlet of the compressor 62 are reliquefied in order to be conveyed to the heat exchanger 50. In this heat exchanger 50, the reliquefied gas vapors are subcooled with the cold of the LNG moving in the pipe 50*a* in order to supply the bottom of the vessel(s) 500A, 500B or the spray bar 60. The LNG vapors coming from the vessel(s) 500A, 500B can be rerouted in the pipeline 64 if FBOG is produced in excess, so as to also be liquefied.

In this implementational example, the subcooling is carried out outside the vessels. In other words, the heat exchanger 50 is separate from the vessels.

FIG. 5 represents an alternative embodiment of the gas treatment system 1 illustrated in FIG. 4. This system 1 differs from that of FIG. 4 in that it comprises a second pump 52 installed in the second vessel 500B adjacent to the first, main, vessel (which is on the right of FIG. 5). This second pump 52 is at a first end of a pipeline 80 in which LNG extracted from the bottom of the second vessel 500B moves. The second end of the pipeline is coupled to the pipeline 57 which is connected to the inlet of the second pipe 50*b*. In other words, the LNG is extracted from the two vessels 500A, 500B and with two pumps 52. This second pump 52 makes it possible to reduce the level of depressurization downstream of the depressurization means by increasing the pressure and the temperature. For example, with the two second pumps, the absolute pressure downstream of the depressurization means is 600 mbar and the temperature of the LNG is −164° C.

FIG. 6 represents another embodiment of the invention of a gas treatment system according to the invention. This system is similar to the embodiment illustrated in FIG. 5. It differs therefrom in that it comprises two heat exchangers 150, 150' instead of a single heat exchanger 50. A first exchanger 150 is configured in order to vaporize the LNG coming from the first vessel 500A and in order to subcool LNG coming from the first vessel 500A simultaneously. The first exchanger 150 comprises the first pipe 150*a* and the second pipe 150*b* arranged as was described in the embodiment of FIG. 4.

The second heat exchanger 150' is configured in order to use the subcooled LNG (in the liquid state) stored in the reserve layer of cold 500*c* coming in this instance from the first vessel 500A in order to reliquefy LNG vapors. These LNG vapors come from a natural evaporation (N BOG) of the LNG not used by the energy production facility 2, that is to say excess BOG. The second heat exchanger 150' comprises the third pipe 150*c* and a second auxiliary pipe 150*b*'. The third pipe 150*c* comprises an inlet which is connected to the pipeline 163 through which LNG vapors produced in excess are conveyed. In particular, the NBOG recirculates via the compressor 62 in the heat exchanger 166 and via the pipeline 164. The third pipe 150*c* comprises an outlet which is connected to the pipeline 169 which emerges at the bottom of the vessel or of each vessel 500A, 500B by a three-way valve 175*b*. The pipeline 169 is also connected to a spray bar 160 via a three-way valve 175*a*, 175*c*.

The second pipe 150*b*' comprises an inlet which is connected to the pipe 154 via a three-way valve. The second pipe 150*b*' comprises an outlet which joins the pipe 156 via the three-way valve 180. A heat exchange is carried out between the excess NBOG and the subcooled LNG coming from the vessel. The reliquefied NBOG is transferred to the bottom of the first and/or second vessel(s). The LNG at the outlet of the second pipe 150*b*' is heated but not vaporized and is returned to the bottom of the first and/or second vessel(s).

In this implementational example, the subcooling is carried out outside the vessels. In other words, the heat exchangers are separate from the vessels.

The invention claimed is:

1. A gas treatment method of a gas storage facility, on board a ship, the method comprising:

extracting a first gas in a liquid state from a first tank or a first vessel, a first subcooling of the first gas in the liquid state, splitting the subcooled first gas into two portions;

storing a first portion of the subcooled first gas in the liquid state in a lower part of the first tank or of the first vessel or of a second tank or of a second vessel, so as to constitute a reserve layer of cold of the first gas in the liquid state at a bottom of the first tank or the second tank or of the first vessel or the second vessel;

cooling a gas in a vapor state using the first gas stored in the reserve layer of cold of the first tank or the second tank or the first vessel or the second vessel, wherein the subcooled first gas, which is stored at the bottom of the first tank or the second tank or the first vessel or the second vessel, creates a refrigerating power that can be subsequently used, the reserve layer of cold being stored at the bottom of located in the first tank or the second tank or the first vessel or the second vessel in a durable manner below an amount of the first gas in the liquid state, forming a liquid-liquid interface, and the method further comprises spraying a second portion of the subcooled first gas stored in the reserve layer of cold into the first tank or the second tank or the first vessel or the second vessel and into a layer of the gas in the vapor state.

2. The method as claimed in claim 1, wherein the first gas is transferred into the first tank or the second tank or the first vessel or the second vessel via a pipeline which emerges in the bottom of the first tank or the second tank or the first vessel or the second vessel.

3. The method as claimed claim 1, wherein the gas in the vapor state is the first gas in the vapor state located in an upper part of one of the first and the second tanks or the first and the second vessels.

4. The method as claimed in claim 1, further comprising extracting the first gas stored in the reserve layer of cold from the bottom of one tank of the first and second tanks or the first and second vessels, and reliquefying the first gas in the vapor state through a heat exchanger.

5. The method as claimed in claim 1, wherein the subcooled first gas is stored in the reserve layer of cold when a measured pressure in the first or second tank or the first or the second vessel is less than a respective first predetermined pressure threshold value of the first or the second tank or of the first or the second vessel.

6. The method as claimed in claim 1, wherein said lower part extends over approximately less than 30% of a height of the first or the second tank or the first or the second vessel, measured from the bottom, said bottom being a lowermost end of the first or the second tank or the first or the second vessel.

7. The method as claimed in claim 1, wherein the subcooled first gas is stored in the reserve layer of cold at a storage temperature between a liquefaction temperature of the first gas and the liquefaction temperature of the first gas less approximately 5° C. to 10° C., at atmospheric pressure, the first gas in the liquid state remaining in the first or the second tank or in the first or the second vessel being at a temperature higher than the storage temperature.

8. The method as claimed in claim 1, wherein the subcooled first gas is stored in the reserve layer of cold at a temperature of between −45° C. and −55° C. or between −160° C. and −170° C., depending on a type of the first gas, the first gas in the liquid state remaining in one of the first and the second tanks or the first and the second vessels being at a temperature of greater than or equal to −42° C. or −160° C., respectively, depending on the type of the first gas.

9. The method as claimed in claim 1, wherein the first subcooling of the first gas is performed with a second gas at least in the liquid state extracted from a particular vessel, the second gas having a boiling point less than or equal to that of the first gas.

10. The method as claimed in claim 9, further comprising vaporizing or heating the second gas, which is heated or vaporized by heat exchange during the first subcooling of the first gas, so as to supply the gas storage facility.

11. The method as claimed in claim 10, further comprising controlling, by the gas storage facility, a flow rate of the second gas, which has to be vaporized or heated during the vaporization.

12. The method as claimed in claim 10, further comprising expanding and partially vaporizing the second gas extracted from the particular vessel before the heat exchange during the first subcooling.

13. The method as claimed in claim 12, further comprising subcooling the second gas extracted from the particular vessel by heat exchange with the expanded and partially vaporized second gas.

14. The method as claimed in claim 1, further comprising a second subcooling of the first gas after the first subcooling.

15. The method as claimed in claim 14, further comprising extracting a second gas used for the second subcooling from the bottom of a particular vessel, or subcooling the second gas.

16. The method as claimed in claim 14, wherein the first and/or second subcooling is performed outside the first or second tanks and/or the first or second vessels.

17. The method as claimed in claim 15, wherein the heat exchange during the first subcooling or the second subcooling between the first gas and the second gas is performed so that a subcooling outlet temperature of the first gas is between a first threshold value and a second threshold value.

18. The method as claimed in claim 14, wherein an outlet temperature of the second gas after the second subcooling is between −155° C. and −105° C. at a pressure of between 2 and 20 bars.

19. The method as claimed in claim 9, further comprising heating the second gas, which is heated, vaporized, or partially vaporized, to supply the facility.

20. The method as claimed in claim 19, further comprising a reliquefaction step in which vapors of the first gas moving in a first circuit from the first tank are reliquefied by heat exchange with the second gas in the liquid state having an inlet temperature and moving in a second circuit, the reliquefied vapors of the first gas being transferred into the first tank or the second tank and the second gas being maintained in the liquid state at an outlet temperature after the reliquefaction and taken back to the first vessel or the second vessel, the heat exchange between the first gas and the second gas being performed so that an outlet temperature of the reliquefied vapors of the first gas is between a first threshold value and a second threshold value.

21. The method as claimed in claim 20, wherein the vapors of the first gas are reliquefied when a pressure measured in the first or the second tank or the first or the second vessel is greater than a respective second predetermined pressure threshold value of the first or the second tank or the first or the second vessel.

22. The method as claimed in claim 1, wherein the first gas is a liquefied natural gas or a liquefied petroleum gas.

23. The method as claimed in claim 9, wherein the second gas is a liquefied natural gas.

24. A gas treatment system of a gas storage facility on board a ship, the system comprising:

a tank or vessel in which a first gas in a liquid state is stored;

a first heat exchanger configured to perform a first subcooling of the first gas extracted from the tank or the vessel, by a first pipeline; and a second pipeline connected to the first heat exchanger, which emerges in a lower part of the tank or the vessel or of another tank or vessel, so as to store the subcooled first gas at a bottom of the tank or the vessel or of the another tank or the other vessel to form a reserve layer of cold of the first gas in the liquid state, a third pipeline connected to the first heat exchanger and a spray bar, the spray bar is arranged in an upper part of the tank or the vessel or of the another tank or vessel, so as to spray the subcooled first gas in a gas headspace of the tank or the vessel or of the another tank or vessel, wherein the first gas stored in the reserve layer of cold of the tank or the vessel or the other tank or the other vessel is used to cool a gas in a vapor state; and the reserve layer of cold is located in the tank or vessel or in the other tank or the other vessel below an amount of the first gas, forming a liquid-liquid interface, wherein said second pipeline emerges in the bottom of said tank or vessel or the other tank or the other vessel.

25. The system as claimed in claim 24, further comprising a second vessel in which a second gas in a liquid state is stored, the second gas having a boiling point less than or equal to that of the first gas.

26. The system as claimed in claim 25, wherein the second gas in the liquid state moves in a second pipeline connected to the first heat exchanger so as to perform the first subcooling of the first gas.

27. The system as claimed in claim 25, further comprising a second heat exchanger configured to perform a second subcooling of the first gas with the second gas in the liquid state.

28. The system as claimed in claim 24, wherein the bottom of the tank or the vessel comprises an outlet connected to a first end of a conduit, the conduit comprising a second end coupled to a spray bar installed in an upper part of the tank or the vessel.

29. The system as claimed in claim 25, further comprising a heating device in which the second gas, heated, vaporized, or partially vaporized in the first heat exchanger, moves.

30. The system as claimed in claim 24, further comprising depressurization means mounted upstream of the first heat exchanger.

31. The system as claimed in claim 27, wherein the second heat exchanger is configured to provide the second gas at an outlet temperature of between −155° C. and −105° C. at a pressure of between 2 and 20 bars.

32. The system as claimed in claim 24, wherein the first gas is a liquefied natural or a liquefied petroleum gas.

33. The system as claimed in claim 25, wherein the second gas is a liquefied natural gas.

34. A liquefied gas transport ship, comprising at least one gas treatment system as claimed in claim 26.

35. The method of claim 1, wherein the gas storage facility is an energy production facility that consumes the gas originating from the first tank or the second tank or in the first vessel or the second vessel.

* * * * *